Oct. 30, 1923.

C. V. LUCIUS 1,472,078

TANK VEHICLE

Filed June 28, 1920   2 Sheets-Sheet 1

Inventor
Christian V. Lucius
By Fred E. Billman Atty.

Oct. 30, 1923.
C. V. LUCIUS
TANK VEHICLE
Filed June 28, 1920
1,472,078
2 Sheets-Sheet 2
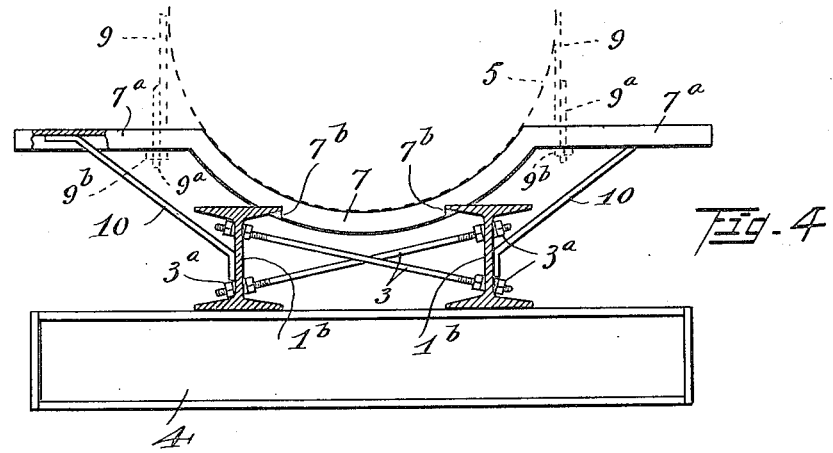
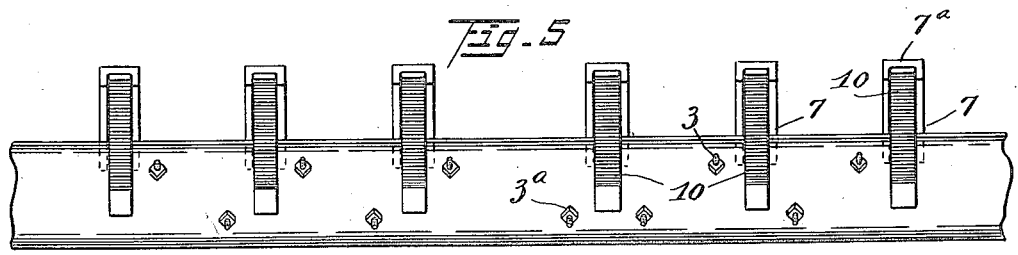
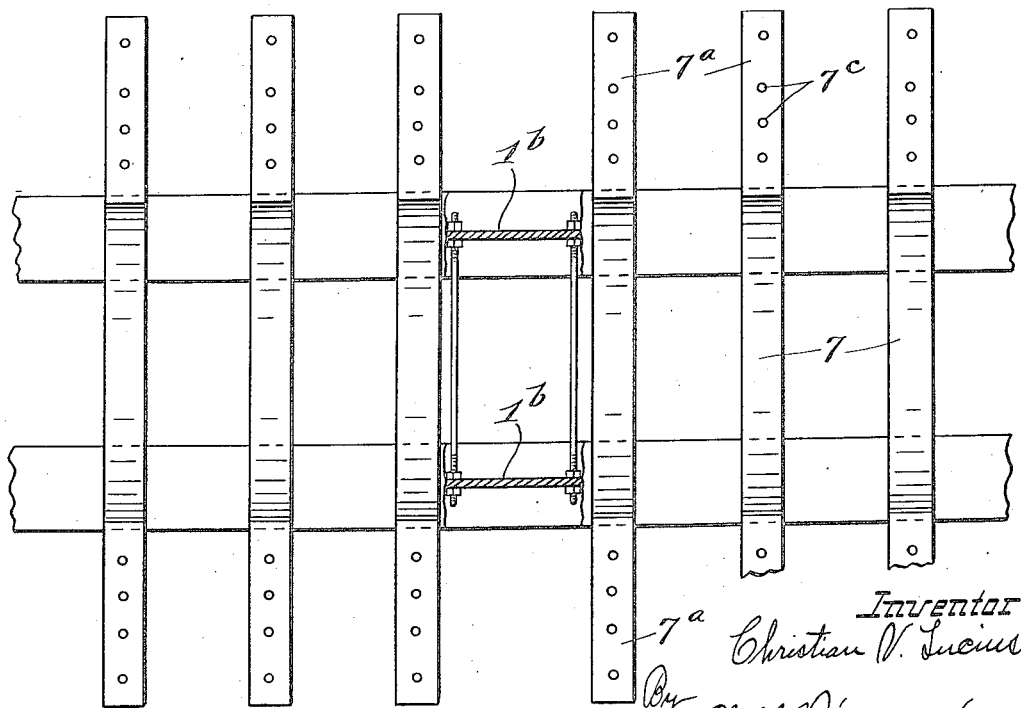

Patented Oct. 30, 1923.

1,472,078

UNITED STATES PATENT OFFICE.

CHRISTIAN V. LUCIUS, OF MASSILLON, OHIO.

TANK VEHICLE.

Application filed June 28, 1920. Serial No. 392,418.

*To all whom it may concern:*

Be it known that I, CHRISTIAN V. LUCIUS, a citizen of the United States, residing at Massillon, in the county of Stark and State of Ohio, have invented certain new and useful Improvements in Tank Vehicles, of which the following is a specification.

My invention relates to improvements in tank vehicles, the primary object of the invention being to provide a generally improved oil carrying and transporting tank vehicle of either the motor truck type or of the railway or tank car type.

A further and very important object is the provision of an improved vehicle chassis, or car frame, together with improved means for securing and connecting the parts in assembled position.

A still further object is the provision of improved removably mounted cross members adapted to be seated upon and to interlock with the longitudinal chassis or frame members, and having curved tank supporting portions conformed to the superposed tank and extending between such longitudinal chassis or frame members, said cross members terminating in laterally projecting or overhanging running board supporting portions, said running board supporting members being adapted to detachably carry a plurality of inverted U-shaped tank securing straps extending over the tank and adjustably secured in an improved location and manner.

With the above mentioned and other ends in view, the invention consists in the novel construction, arrangement, and combination of parts, hereinafter described, illustrated in some of its embodiments in the accompanying drawings, and particularly pointed out in the appended claims.

Figure 1:
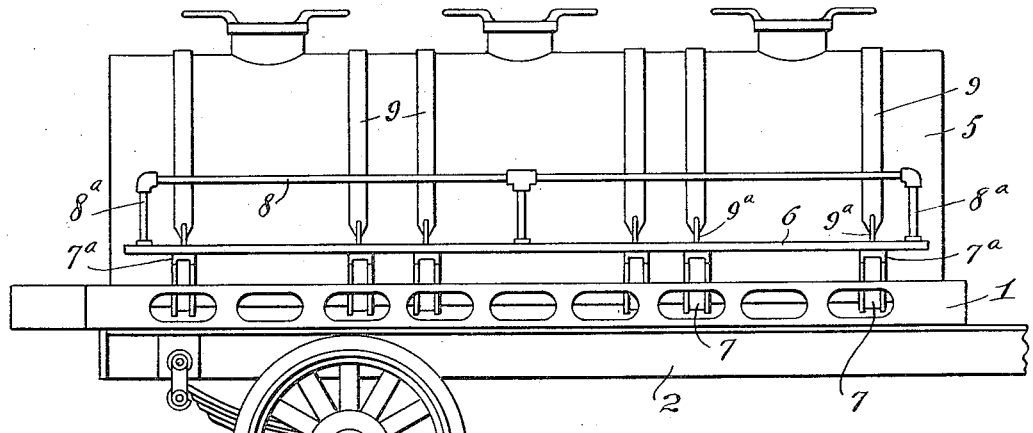

Referring to the drawings, forming a part of this specification, Figure 1 is a side elevation of a tank vehicle of the motor truck type constructed in accordance with this invention.

Figure 2:
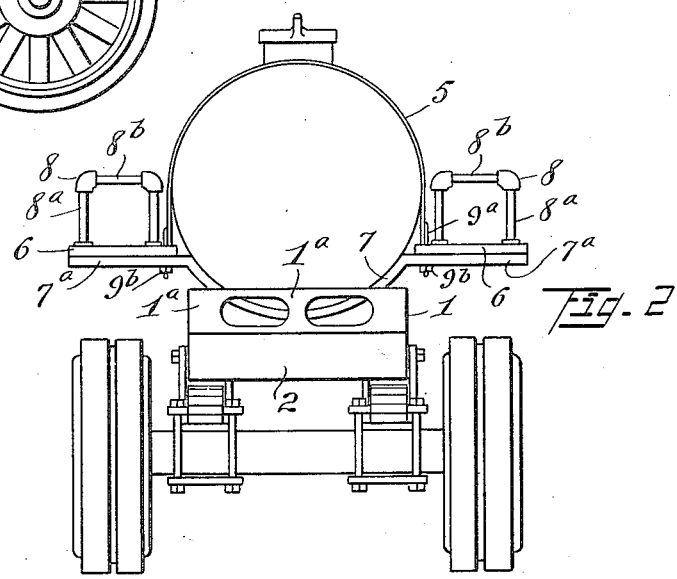

Fig. 2, a rear elevation of the same.

Figure 3:
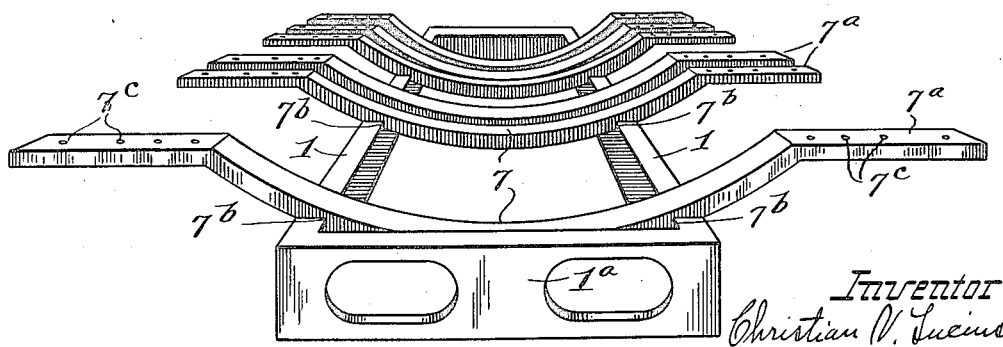

Fig. 3, a perspective view of the vehicle chassis frame and tank supporting cross members, the tank and overhanging tank securing straps being removed for the purpose of clearer illustration of the parts.

Fig. 4, a view partly in cross section and partly in end elevation of a vehicle frame and tank supporting cross members of the railway or tank car type.

Fig. 5, a fragmentary side elevation of the same.

Fig. 6, a fragmentary top plan view of the same, certain portions being broken away for the purpose of clearer illustration.

Similar numerals of reference designate like parts thruout all the figures of the drawings.

The improved chassis comprises a pair of longitudinally extending channel bars, 1, and for use as a motor truck vehicle is preferably provided with end members, 1ª, forming a rectangular frame which, if desired, may be mounted on a subjacent frame structure, 2, connected to the running gear of the motor vehicle.

For use as a tank car, the chassis side or frame members are preferably in the form of I-beams, 1ᵇ, as shown in Figs. 4, 5 and 6 of the drawings, and in such instance the I-beams are preferably braced by means of the brace rods, 3, detachably and adjustably connected to the web portions of the I-beams by means of nuts, 3ª. As a tank car the longitudinally extended side bars, 1ᵇ, may be mounted on cross or bolster bars, 4, mounted in a suitable manner on the car truck.

As a means of supporting the tank, 5, and running boards, 6, and particularly as a means of securely bracing and reinforcing the structure as a whole, suitable cross bars are removably mounted above the side bars, 1, or beams 1ᵇ, each of said cross bars comprising a curved intermediate portion, 7, conformed to and adapted to form a seat, for the superposed tank, 5, and terminating at its ends in horizontally extending running board supporting members, 7ª, projecting laterally and overhanging the main chassis or car frame. As a means of removably mounting or seating the curved or depending tank supporting members, 7, between the side bars, 1, or 1ᵇ, as the case may be, the members, 7, are provided on their lower sides with recesses forming shoulders, 7ᵇ, said recesses being adapted to receive the inner edges of the side bars, 1 or 1ᵇ, and said shoulders being adapted to engage or interlock with such bars in preventing relative movement or displacement.

The cross bars are preferably in the form of channels, as shown most clearly in Figs. 1 and 5 of the drawings, and may be provided with openings, 7ᶜ, thru which fastening elements may be passed in securing the running boards, 6, thereon, and when used as a motor or truck vehicle the running boards, 6, are preferably provided with side rails or guards, 8, mounted on suitable posts, 8ª, and provided at their rear with cross rails, 8ᵇ, such rails and running boards in such instance being admirably adapted for receiving and carrying a plurality of portable containers or vessels such as used frequently in connection with tank vehicles of this class.

As a means of securing and clamping the tank, 5, within the tank seat forming portions, 7, of the cross members, the projecting running board supporting members, 7ª, are provided with inverted U-shaped straps, 9ª, extending over the tank, 5, and provided at their lower ends with bolts, 9ª, extending thru suitable openings in the members, 7ª, and being provided with securing and clamping bolts, 9ᵇ. It will be obvious that by means of the bolts, 9ᵇ, the straps, 9, may be readily detached or attached, as desired, and such straps may be securely drawn up or clamped in proper position.

In the form shown in Figs. 4, 5, and 6 of the drawings, the projecting ends, 7ª, may be further braced and reinforced by means of the brace members, 10, secured on the under or channeled portions of the members, 7ª, and secured to the outer sides or web portions of the I-beams, 1ᵇ, as shown most clearly in Fig. 4 of the drawings.

Having thus described some of the embodiments of my invention, what I claim and desire to secure by Letters Patent, is,—

1. In a tank vehicle, the combination with a chassis frame including laterally reinforced longitudinally extending side beams; of channel shaped tank and running board supporting members mounted transversely of said chassis frame with the flanged sides thereof extending downwardly and provided with recesses receiving and interlocking with the upper inner corners of said chassis side beams, said tank and running board supporting members each comprising a curved tank receiving and supporting portion depending between said chassis side beams and terminating in horizontal running board supporting end portions arranged above the planes of the upper portions of said chassis side frames and projecting laterally therefrom.

2. A tank vehicle, comprising a chassis frame including longitudinal chassis side beams, tank and running board supporting cross members comprising curved tank receiving and supporting portions extending below the horizontal planes of the upper edges of said chassis side beams, said curved tank receiving and supporting portions being provided with subjacent notches receiving and interlocking with the edges of said chassis side beams, and said cross supporting members terminating in horizontally extending running board supporting end portions extending above the planes of said chassis side frames and projecting therefrom, a tank seated in said curved tank receiving and supporting portions of said cross members, tank securing straps terminating in bolts extending through and adjustably connected to said running board supporting members, and means for holding said tank supporting cross members in seated position and bracing said frame and tank supporting cross members relatively of each other.

In testimony whereof I have affixed my signature.

CHRISTIAN V. LUCIUS.